United States Patent

Miller

[15] 3,660,925
[45] May 9, 1972

[54] BOAT BRACKET FOR FISH NETS

[72] Inventor: Glenn E. Miller, 6220 Cumberland Avenue, Apt. 201, Springfield, Va. 22150

[22] Filed: Apr. 21, 1970

[21] Appl. No.: 30,529

[52] U.S. Cl. ............................................. 43/55
[51] Int. Cl. .......................................... A01k 97/00
[58] Field of Search ...................... 43/55, 11, 12; 248/226

[56] References Cited

UNITED STATES PATENTS

| | | | |
|---|---|---|---|
| 680,680 | 8/1901 | Armstrong | 248/226 |
| 691,465 | 1/1902 | Higgins | 43/12 |
| 2,272,569 | 2/1942 | Luhmann | 43/55 |
| 2,795,889 | 6/1957 | Garland | 43/55 |
| 2,834,138 | 5/1958 | Pedersen | 43/55 X |

Primary Examiner—Warner H. Camp
Attorney—Laurence R. Brown

[57] ABSTRACT

A device for supporting a fish net from a boat includes an adjustable clamp for securing it to the boat while the net depends downwards from a ring portion of the device, the ring portion being adjustable by the use of a bolt and wing nut fastener.

4 Claims, 2 Drawing Figures

PATENTED MAY 9 1972

3,660,925

INVENTOR.
GLENN E. MILLER

BOAT BRACKET FOR FISH NETS

This invention relates generally to fish nets for sport fishermen.

It is therefore the primary purpose of the present invention to provide a boat bracket which may be attached anywhere to the boat and will allow the fisherman to easily drop the fresh caught fish into the net portion depending therefrom.

Another object of this invention is to provide a boat bracket for a fish net which will have a circular ring portion that is adjustable to various diameters to accommodate nets of various sizes, the ring portion having openings for receiving the hook ends of chains attached to the upper portion of the net.

A further object of this invention is to provide a boat bracket of the type described which will have a clamp portion which is adjustable for the desired elevation of the ring member.

Other objects of the present invention are to provide a boat bracket for fish nets which is simple in design, inexpensive to manufacture, rugged in construction, easy to use and efficient in operation.

These and other objects will become readily evident upon a study of the following specification together with the accompanying drawing wherein.

Figure 1:
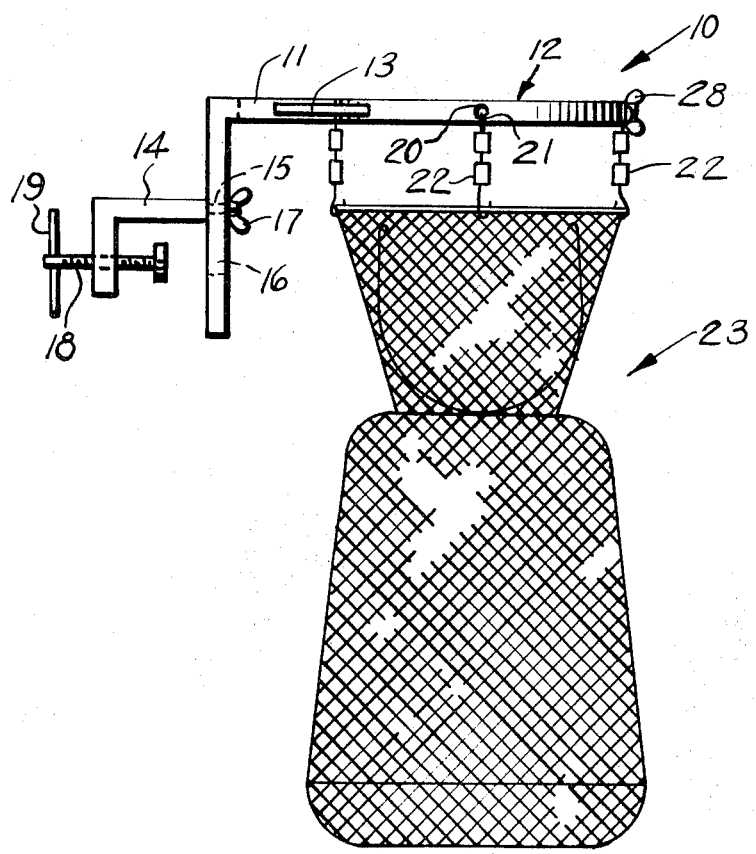
FIG. 1 is a side view of the present invention showing a net for live fish depending therefrom, the bracket being shown in elevation.
Figure 2:
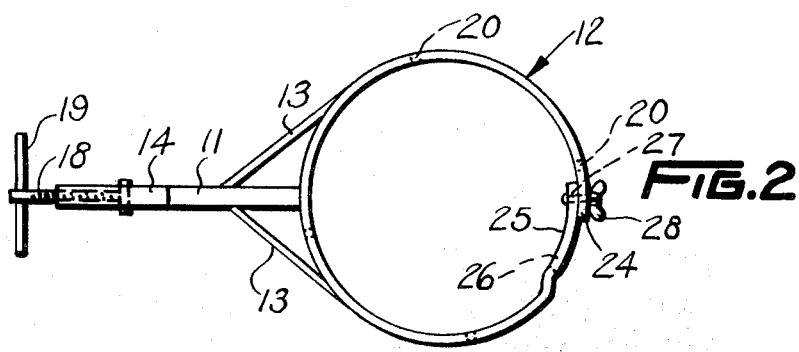
FIG. 2 is a top plan view of the invention showing the net removed therefrom.

According to this invention, a bracket 10 includes an L-shaped configurated arm 11 which is fixably secured to and extending from the ring 12, the arm 11 and the ring 12 being made of a suitable metal. Bracket 10 is also provided with reenforcement bars 13 secured fixably by suitable means to the sides of arm 11 on the outer periphery of ring 12. A smaller L-shaped configurated member 14 serving as a clamp portion of bracket 10 includes a bolt 15 which is slidable within elongated vertical slot 16 of arm 11 and carries a wing nut fastener 17 which allows for the raising and lowering of arm 11 to a desired elevation. Member 14 also carries a threaded clamp screw 18 having a handle bar 19 for rotating it in order that it may be secured or un-secured from the gunwhale of the boat (not shown).

Ring 12 is provided with a plurality of spaced apart openings 20 which receive the hooks 21 on the plurality of chains 22 of net 23. The ends 24 and 25 of the ring 12 allow for adjustment of the diameter of ring 12 and end 25 is provided with a slot 26 which receives a threaded bolt 27 having a wing nut 28, the wing nut 28 being tightened when a desired diameter of ring 12 is found.

In use, member 14 of bracket 10 is placed upon the gunwhale or other desired portion of the boat and the clamp screw 18 is tightened. The ring portion of bracket 10 is then ready for the support of net 23 which will depend therefrom by means of the hooks 21 of chains 22 being received within openings 20.

Because of this desired arrangement of bracket 10 the fisherman merely has to drop the fresh caught fist within the ring 12 whereupon it decends into the net 23.

What I now claim is:

1. A bracket attachable to the gunwhale of a boat for supporting sportsmen caught fish, comprising, an L-shaped configurated bracket arm having horizontal and vertical legs, clamp means on the vertical leg for securing the bracket to the boat, a circumferentially adjustable ring portion carried by said arm on the horizontal leg to extend outwardly from the boat, a net, means attaching the net to said ring portion to depend therefrom and adjustable elevation means for selectively moving the vertical leg of said bracket relative to the boat to thereby position the net relative to the water level.

2. The combination according to claim 1, wherein said vertical leg of the L-shaped arm portion of said bracket includes an L-shaped clamp portion extending therefrom with a vertical leg parallel to the vertical leg of said bracket arm, said clamp portion being held to said bracket by an extending and externally threaded stud, an elongated slot in said vertical leg of said bracket receiving said stud and a wing nut fastener affixed onto said stud thereby comprising said elevation means for the adjustment of height of said L-shaped arm portion, and said clamp means comprises a clamp screw extending through said vertical leg of the L-shaped clamp portion and having handle means for rotating it.

3. The combination according to claim 1 wherein said ring is provided with a plurality of openings which are spaced apart and chains secured to said net and said openings.

4. The combination according to claim 3 including adjustment means for changing the diameter of said ring of said bracket by circumferentially adjusting said ring portion comprising, two overlapping ends to the ring portion, an elongated slot in one end of said ring and an opening in the other end, said slot and said opening carrying a threaded bolt with a wing nut fastener extending through the openings in both ends to secure the ring at particular diameters desired in order that said bracket may accommodate nets of different sizes.

* * * * *